(12) United States Patent
Togashi

(10) Patent No.: US 7,646,584 B2
(45) Date of Patent: Jan. 12, 2010

(54) MULTILAYER FEEDTHROUGH CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 164 days.

(21) Appl. No.: 12/051,411

(22) Filed: Mar. 19, 2008

(65) Prior Publication Data
US 2008/0239624 A1 Oct. 2, 2008

(30) Foreign Application Priority Data
Mar. 29, 2007 (JP) ............................ P2007-087998

(51) Int. Cl.
  *H01G 4/005* (2006.01)
  *H01G 4/006* (2006.01)
(52) U.S. Cl. ...................................... 361/303; 361/311
(58) Field of Classification Search ................. 361/311, 361/303–305
See application file for complete search history.

(56) References Cited

U.S. PATENT DOCUMENTS 3,740,624 A * 6/1973 McAdams et al. ........ 361/321.3
7,046,500 B2 * 5/2006 Lee et al. ..................... 361/303
7,199,996 B2 * 4/2007 Togashi et al. .............. 361/303
7,599,166 B2 * 10/2009 Lee et al. .................. 361/306.3
2007/0109717 A1 * 5/2007 Lee et al. ..................... 361/303
2008/0158773 A1 * 7/2008 Lee et al. .................. 361/306.3

FOREIGN PATENT DOCUMENTS

| JP | A 01-206615 | 8/1989 |
| JP | A 2004-179316 | 6/2004 |
| JP | A 2006-013154 | 1/2006 |

* cited by examiner

*Primary Examiner*—Eric Thomas
(74) *Attorney, Agent, or Firm*—Oliff & Berridge, PLC

(57) ABSTRACT

A capacitor body of a multilayer feedthrough capacitor is arranged with grounding inner electrodes and signal inner electrodes. The grounding inner electrodes include first and second grounding main electrode portions, grounding connection electrode portions having no areas opposing the signal inner electrodes, and first and second grounding lead electrode portions. The signal inner electrodes include first and second signal main electrode portions, signal connection electrode portions having no areas opposing the grounding inner electrodes, and first and second signal lead electrode portions.

4 Claims, 10 Drawing Sheets

MULTILAYER FEEDTHROUGH CAPACITOR

BACKGROUND OF THE INVENTION

1. Field of the Invention

The present invention relates to a multilayer feedthrough capacitor.

2. Related Background Art

Known as this kind of multilayer feedthrough capacitor is one comprising a capacitor body in which dielectric layers are alternately laminated with signal inner electrodes and grounding inner electrodes, and a signal terminal electrode and a grounding terminal electrode which are formed on the capacitor body (see, for example, Japanese Patent Application Laid-Open No. 01-206615).

SUMMARY OF THE INVENTION

It is an object of the present invention to provide a multilayer feedthrough capacitor which can realize a circuit connecting a plurality of capacitance components in parallel by a single element.

In general, a plurality of multilayer feedthrough capacitors is mounted an electronic device. Therefore, the mounting space within the electronic device is consumed by the number of capacitors to be mounted. Hence, the inventors conducted diligent studies concerning a multilayer feedthrough capacitor which can realize a plurality of parallel circuits by a single device and, as a result, have achieved the present invention.

In view of these results of studies, the present invention provides a multilayer feedthrough capacitor comprising a capacitor body having a dielectric characteristic; grounding and signal inner electrodes arranged within the capacitor body; first and second grounding terminal electrodes arranged on outer surface of the capacitor body; and first and second signal terminal electrodes arranged on the outer surface of the capacitor body; wherein the grounding inner electrode includes a first grounding main electrode portion, a second grounding main electrode portion, a first grounding lead electrode portion extending from the first grounding main electrode portion so as to be drawn to the outer surface of the capacitor body and connected to the first grounding terminal electrode, a second grounding lead electrode portion extending from the second grounding main electrode portion so as to be drawn to the outer surface of the capacitor body and connected to the second grounding terminal electrode, and a grounding connection electrode portion positioned between the first and second grounding main electrode portions; wherein the signal inner electrode includes a first signal main electrode portion, a second signal main electrode portion, a first signal lead electrode portion extending from the first signal main electrode portion so as to be drawn to the outer surface of the capacitor body and connected to the first signal terminal electrode, a second signal lead electrode portion extending from the second signal main electrode portion so as to be drawn to the outer surface of the capacitor body and connected to the second signal terminal electrode, and a signal connection electrode portion positioned between the first and second signal main electrode portions; wherein the first grounding main electrode portion and first signal main electrode portion oppose each other with a portion of the capacitor body therebetween; wherein the second grounding main electrode portion and second signal main electrode portion oppose each other with a portion of the capacitor body therebetween; wherein the grounding connection electrode portion has no area opposing the signal inner electrode; and wherein the signal connection electrode portion has no area opposing the grounding inner electrode.

In this multilayer feedthrough capacitor, each of the grounding and signal inner electrodes has a plurality of main electrode portions opposing each other. On the other hand, the grounding and signal inner electrodes have respective connection electrode portions which do not oppose each other. Therefore, the multilayer feedthrough capacitor realizes a circuit in which a capacitance formed by the first grounding main electrode portion and first signal main electrode portion and a capacitance formed by the second grounding main electrode portion and second signal main electrode portion are connected in parallel to each other.

The capacitor body may include rectangular first and second main faces opposing each other, first and second end faces extending in a shorter-side direction of the first and second main faces so as to connect the first and second main faces to each other, and first and second side faces extending in a longer-side direction of the first and second main faces so as to connect the first and second main faces to each other; wherein the signal inner electrode and grounding inner electrode oppose each other in the opposing direction of the first and second main faces; and wherein the grounding connection electrode portion and signal connection electrode portion are separated from each other in the opposing direction of the first and second side faces of the capacitor body.

Since the grounding connection electrode portion and signal connection electrode portion are formed so as to be separated from each other, a plurality of capacitance components formed in the multilayer feedthrough capacitor are favorably separated from each other.

Preferably, in this case, the first and second grounding terminal electrodes are arranged on the first side face of the capacitor body; the first and second signal terminal electrodes are arranged on the second side face of the capacitor body; the grounding connection electrode portion connects an end portion of the first grounding main electrode portion on the second side face side to an end portion of the second grounding main electrode portion on the second side face side; and the signal connection electrode portion connects an end portion of the first signal main electrode portion on the first side face side to an end portion of the second signal main electrode portion on the first side face side.

This is preferred, since the grounding connection electrode portion and signal connection electrode portion are separated farther from each other.

Preferably, the first and second grounding main electrode portions have areas different from each other in the grounding inner electrode, while the first and second signal main electrode portions have areas different from each other in the signal inner electrode.

In this case, a plurality of capacitance components having sizes different from each other are formed in the multilayer feedthrough capacitor. Therefore, the multilayer feedthrough capacitor can exhibit low impedance over a wide frequency range.

The present invention can provide a multilayer feedthrough capacitor which can realize a circuit connecting a plurality of capacitance components in parallel by a single element.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments will be explained in detail with reference to the accompanying drawings. In the explanation, the same constituents or those having the same functions will be referred to with the same numerals or letters while omitting their overlapping descriptions.

First Embodiment

Figure 1:
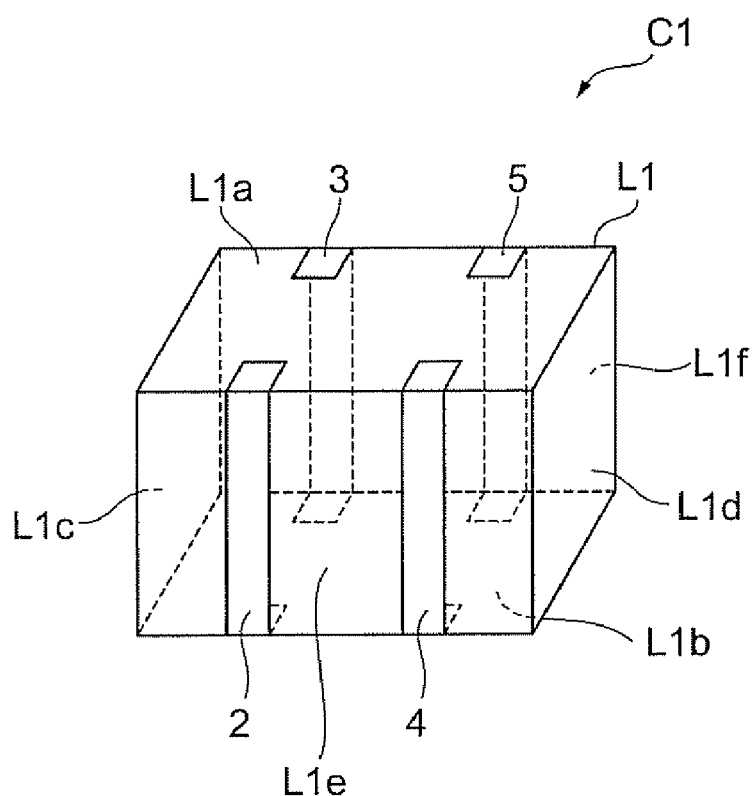
FIG. 1 is a perspective view of the multilayer feedthrough capacitor in accordance with the first embodiment.
Figure 2:
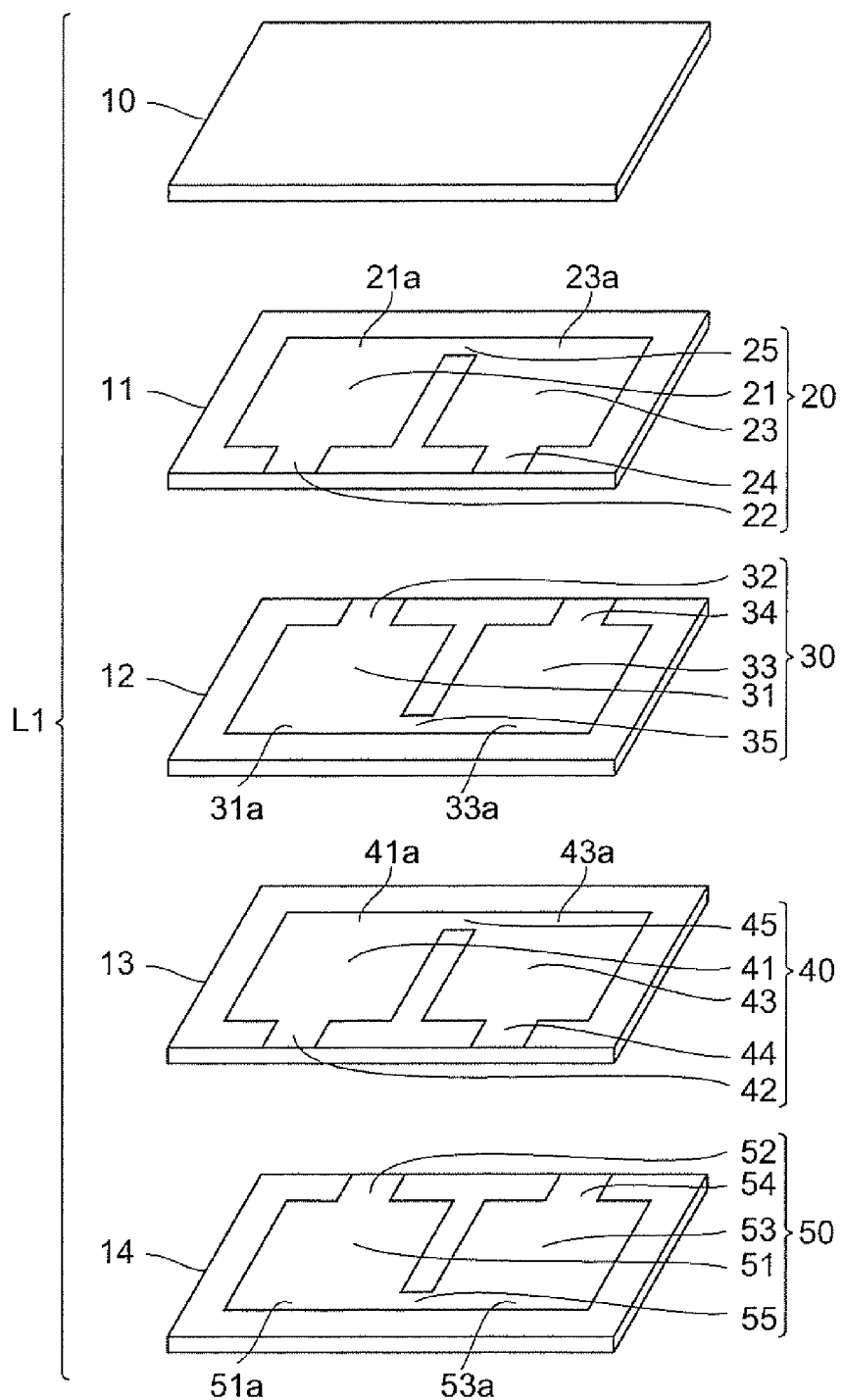
FIG. 2 is an exploded perspective view of the capacitor body included in the multilayer feedthrough capacitor in accordance with the first embodiment.
Figure 3:
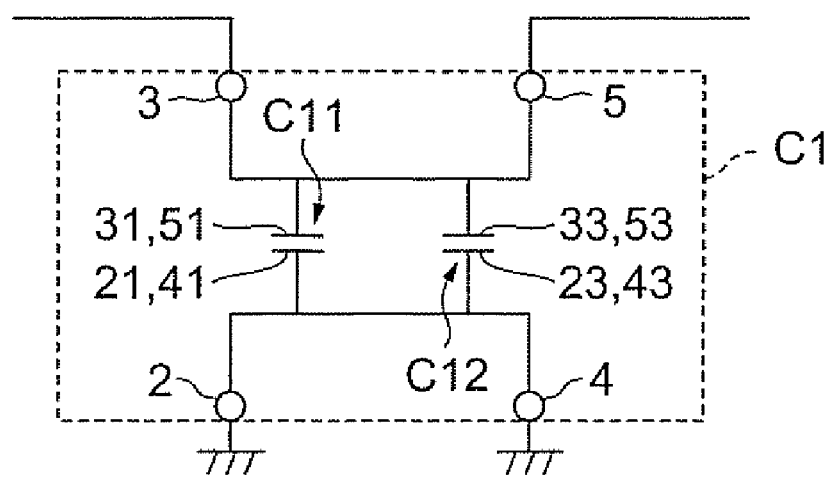
FIG. 3 is an equivalent circuit diagram of the multilayer feedthrough capacitor in accordance with the first embodiment.

With reference to FIGS. 1 to 4, the structure of the multilayer feedthrough capacitor C1 in accordance with the first embodiment will be explained. FIG. 1 is a perspective view of the multilayer feedthrough capacitor in accordance with the first embodiment. FIG. 2 is an exploded perspective view of the capacitor body included in the multilayer feedthrough capacitor in accordance with the first embodiment. FIG. 3 is an equivalent circuit diagram of the multilayer feedthrough capacitor in accordance with the first embodiment.

As shown in FIG. 1, the multilayer feedthrough capacitor C1 in accordance with the first embodiment comprises a capacitor body L1, first and second grounding terminal electrodes 2, 4 arranged on outer surface of the capacitor body L1, and first and second signal terminal electrodes 3, 5 arranged on the outer surface of the capacitor body L1. The first and second grounding terminal electrodes 2, 4 and first and second signal terminal electrodes 3, 5 are formed, for example, by attaching and burning a conductive paste, which contains a conductive metal powder and a glass frit, onto the outer surface of the capacitor body. A plating layer may be formed on the burned terminal electrodes when necessary. The first and second grounding terminal electrodes 2, 4 and first and second signal terminal electrodes 3, 5 are formed such as to be electrically insulated from each other on the surfaces of the capacitor body L1.

As shown in FIG. 1, the capacitor body L1 is shaped like a rectangular parallelepiped and includes rectangular first and second main faces L1a, L1b opposing each other, first and second end faces L1c, L1d extending in the shorter-side direction of the first and second main faces L1a, L1b so as to connect the first and second main faces L1a, L1b to each other and opposing each other, and first and second side faces L1e, L1f extending in the longer-side direction of the first and second main faces L1a, L1b so as to connect the first and second main faces L1a, L1b to each other and opposing each other.

The first and second grounding terminal electrodes 2, 4 are arranged on the first side face L1e of the capacitor body L1. The first and second grounding terminal electrodes 2, 4 are successively arranged on the first side face L1e from the first end face L1c side to the second end face L1d side.

The first and second signal terminal electrodes 3, 5 are arranged on the second side face L1f of the capacitor body L1. The first and second signal terminal electrodes 3, 5 are successively arranged on the second side face L1f from the first end face L1c side to the second end face L1d side.

As shown in FIG. 2, the capacitor body L1 includes a plurality of (5 in this embodiment) laminated dielectric layers 10 to 14. Each of the dielectric layers 10 to 14 is constituted by a sintered body of a ceramic green sheet containing a dielectric ceramic, for example. In the actual multilayer feedthrough capacitor C1, the dielectric layers 10 to 14 are integrated to such an extent that their boundaries are indiscernible.

In the capacitor body L1, as shown in FIG. 2, a plurality (2 layers in this embodiment) of grounding inner electrodes 20, 40 are alternately arranged with a plurality (2 layers in this embodiment) of signal inner electrodes 30, 50. The grounding inner electrodes 20, 40 and signal inner electrodes 30, 50 are constituted by sintered bodies of a conductive paste, for example.

The grounding inner electrode 20 and signal inner electrode 30 oppose each other along the opposing direction of the first and second main faces L1a, L1b, with one dielectric layer 11 therebetween, the dielectric layer 11 being a portion of the capacitor body L1. The signal inner electrode 30 and grounding inner electrode 40 oppose each other along the opposing direction of the first and second main faces L1a, L1b, with one dielectric layer 12 therebetween, the dielectric layer 12 being a portion of the capacitor body L1. The grounding inner electrode 40 and signal inner electrode 50 oppose each other along the opposing direction of the first and second main faces L1a, L1b, with one dielectric layer 13 therebetween, the dielectric layer 13 being a portion of the capacitor body L1.

The grounding inner electrode 20 includes rectangular first and second grounding main electrode portions 21, 23 whose longer sides extend in the shorter-side direction of the first and second main faces L1a, L1b of the capacitor body L1, first and second grounding lead electrode portions 22, 24 extending from the first and second grounding main electrode portions 21, 23 to the first side face L1e, and a rectangular grounding connection electrode portion 25 whose longer side extends in the longer-side direction of the first and second main faces L1a, L1b of the capacitor body L1. The grounding inner electrode 40 includes rectangular first and second grounding main electrode portions 41, 43 whose longer sides extend in the shorter-side direction of the first and second main faces L1a, L1b of the capacitor body L1, first and second grounding lead electrode portions 42, 44 extending from the first and second grounding main electrode portions 41, 43 to the first side face L1e, and a rectangular grounding connection electrode portion 45 whose longer side extends in the longer-side direction of the first and second main faces L1a, L1b of the capacitor body L1.

The first and second grounding main electrode portions 21, 41, 23, 43 are positioned separately from each other in the order of the first grounding main electrode portions 21, 41 and second grounding main electrode portions 23, 43 along the opposing direction of the first and second end faces L1c, L1d. The first and second grounding main electrode portions 21, 41 have forms substantially identical to those of the first and second grounding main electrode portions 23, 43.

The first grounding lead electrode portions 22, 42 extend from the first grounding main electrode portions 21, 41 so as to be exposed at the first side face L1e and physically and electrically connected to the first grounding terminal electrode 2. The second grounding lead electrode portions 24, 44 extend from the second grounding main electrode portions 23, 43 so as to be exposed at the first side face L1e and physically and electrically connected to the second grounding terminal electrode 4.

The grounding connection electrode portions 25, 45 are positioned between the first grounding main electrode portions 21, 41 and second grounding main electrode portions 23, 43, so as to connect the first grounding main electrode portions 21, 41 to the second grounding main electrode portions 23, 43. The grounding connection electrode portions 25, 45 extend in the opposing direction of the first and second end faces L1c, L1d.

The grounding connection electrode portion 25 connects an end portion 21a of the first grounding main electrode portion 21 on the second side face L1f side to an end portion 23a of the second grounding main electrode portion 23 on the second side face L1f side. The grounding connection electrode portion 45 connects an end portion 41a of the first grounding main electrode portion 41 on the second side face L1f side to an end portion 43a of the second grounding main electrode portion 43 on the second side face L1f side.

The signal inner electrode 30 includes rectangular first and second signal main electrode portions 31, 33 whose longer sides extend in the shorter-side direction of the first and second main faces L1a, L1b of the capacitor body L1, first and second signal lead electrode portions 32, 34 extending from the first and second signal main electrode portions 31, 33 to the second side face L1f, and a rectangular connection electrode portion 35 whose longer side extends in the longer-side direction of the first and second main faces L1a, L1b of the capacitor body L1. The signal inner electrode 50 includes rectangular first and second signal main electrode portions 51, 53 whose longer sides extend in the shorter-side direction of the first and second main faces L1a, L1b of the capacitor body L1, first and second signal lead electrode portions 52, 54 extending from the first and second signal main electrode portions 51, 53 to the second side face L1f, and a rectangular connection electrode portion 55 whose longer side extends in the longer-side direction of the first and second main faces L1a, L1b of the capacitor body L1.

The first and second grounding main electrode portions 31, 51, 33, 53 are positioned separately from each other in the order of the first grounding main electrode portions 31, 51 and second grounding main electrode portions 33, 53 along the opposing direction of the first and second end faces L1c, L1d. The first and second grounding main electrode portions 31, 51 have forms substantially identical to those of the first and second grounding main electrode portions 33, 53.

The first signal lead electrode portions 32, 52 extend from the first signal main electrode portions 31, 51 so as to be exposed at the second side face L1f and physically and electrically connected to the first signal terminal electrode 3. The second signal lead electrode portions 34, 54 extend from the second signal main electrode portions 33, 53 so as to be exposed at the second side face L1f and physically and electrically connected to the second signal terminal electrode 5.

The signal connection electrode portions 35, 55 are positioned between the first signal main electrode portions 31, 51 and second signal main electrode portions 33, 53, so as to connect the first signal main electrode portions 31, 51 to the second signal main electrode portions 33, 53. The signal connection electrode portions 35, 55 extend in the opposing direction of the first and second end faces L1c, L1d.

The signal connection electrode portion 35 connects an end portion 31a of the first signal main electrode portion 31 on the first side face L1e side to an end portion 33a of the second signal main electrode portion 33 on the first side face L1e side. The signal connection electrode portion 55 connects an end portion 51a of the first signal main electrode portion 51 on the first side face L1e side to an end portion 53a of the second signal main electrode portion 53 on the first side face L1e side.

When seen in the opposing direction of the first and second main faces L1a, L1b, the grounding connection electrode portions 25, 45 and the signal connection electrode portions 35, 55 are separated from each other in the opposing direction of the first and second side faces L1e, L1f.

The first grounding main electrode portion 21 and first signal main electrode portion 31 oppose each other, with the dielectric layer 11 therebetween. The second grounding main electrode portion 23 and second signal main electrode portion 33 oppose each other, with the dielectric layer 11 therebetween. On the other hand, the grounding connection electrode portion 25 has no area opposing the signal inner electrode 30. The signal connection electrode portion 35 has no area opposing the grounding inner electrode 20.

The first signal main electrode portion 31 and first grounding main electrode portion 41 oppose each other, with the dielectric layer 12 therebetween. The second signal main electrode portion 33 and second grounding main electrode portion 43 oppose each other, with the dielectric layer 12 therebetween. On the other hand, the signal connection electrode portion 35 has no area opposing the grounding inner electrode 40. The grounding connection electrode portion 45 has no area opposing the signal inner electrode 30.

The first grounding main electrode portion 41 and first signal main electrode portion 51 oppose each other, with the dielectric layer 13 therebetween. The second grounding main electrode portion 43 and second signal main electrode portion 53 oppose each other, with the dielectric layer 13 therebetween. On the other hand, the grounding connection electrode portion 45 has no area opposing the signal inner electrode 50. The signal connection electrode portion 55 has no area opposing the grounding inner electrode 40.

FIG. 3 is an equivalent circuit diagram of the multilayer feedthrough capacitor C1. FIG. 3 illustrates a case where the first and second grounding terminal electrodes 2, 4 are grounded, whereas the first and second signal terminal electrodes 3, 5 are connected to signal leads. In the multilayer feedthrough capacitor C1, the first grounding main electrode portions 21, 41 of the grounding inner electrodes 20, 40 and the first signal main electrode portions 31, 51 of the signal inner electrodes 30, 50 oppose each other, thereby forming a capacitance C11. Further, the second grounding main electrode portions 23, 43 of the grounding inner electrodes 20, 40 and the second signal main electrode portions 33, 53 of the signal inner electrodes 30, 50 oppose each other, thereby forming a capacitance C12.

On the other hand, the grounding connection electrode portions 25, 45 of the grounding inner electrodes 20, 40 have no areas opposing any of the signal inner electrodes 30, 50. The signal connection electrode portions 35, 55 of the signal inner electrodes 30, 50 have no areas opposing any of the grounding inner electrodes 20, 40.

Therefore, as shown in FIG. 3, the multilayer feedthrough capacitor C1 can realize a circuit in which two capacitors having the respective capacitances C11, C12 are connected in parallel.

In the multilayer feedthrough capacitor C1, the grounding connection electrode portions 25, 45 and the signal connection electrode portions 35, 55 are formed so as to be separated from each other. Therefore, a plurality of capacitances C11, C12 formed in the multilayer feedthrough capacitor C1 are favorably separated from each other.

In the multilayer feedthrough capacitor C1, the grounding connection electrode portions 25, 45 connect the end portions 21a, 41a, 23a, 43a of the first and second grounding main electrode portions 21, 41, 23, 43 on the second side face L1f side in particular. Namely, the grounding connection electrode portions 25, 45 are arranged on the second side face L1f side. On the other hand, the signal connection electrode portions 35, 55 connect the end portions 31a, 51a, 33a, 53a of the first and second signal main electrode portions 31, 51, 33, 53 on the first side face L1e side. That is, the signal connection electrode portions 35, 55 are arranged on the first side face L1e side. Thus, the connection electrode portions are arranged closer to the side faces of the capacitor body L1 on the sides opposite from each other, whereby a sufficiently large distance can physically be obtained between the grounding connection electrode portions 25, 45 and signal connection electrode portions 35, 55. Therefore, the multilayer feedthrough capacitor C1 can separate a plurality of capacitances C11, C12 more favorably from each other.

Though the first grounding main electrode portions 21, 41 and first signal main electrode portions 31, 51 have forms substantially identical to those of the second grounding main electrode portions 23, 43 and second signal main electrode portions 33, 53, respectively, in the multilayer feedthrough capacitor C1 in accordance with the first embodiment, they may differ from each other.

Figure 4:
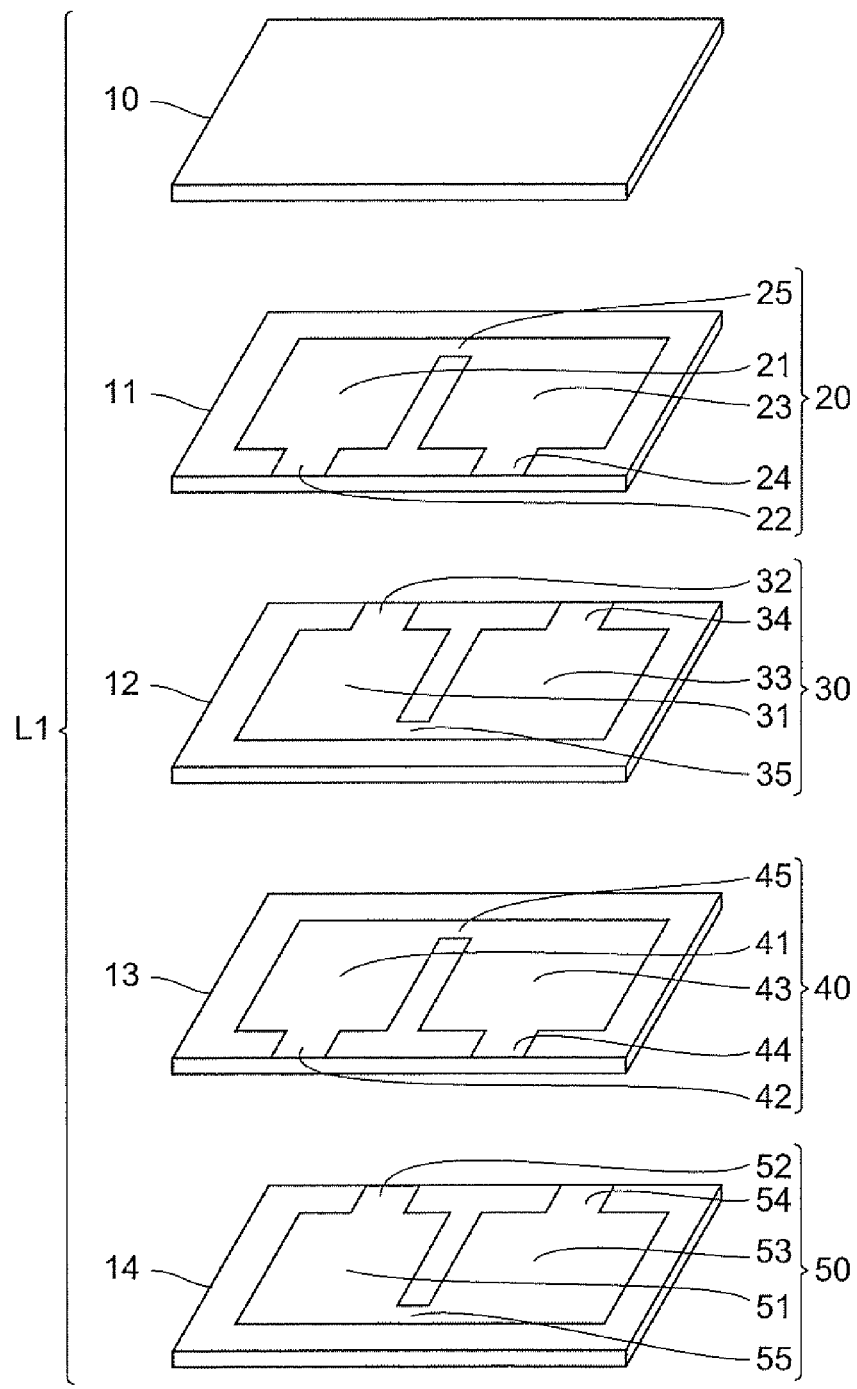
FIG. 4 is an exploded perspective view of the capacitor body included in a modified example of the multilayer feedthrough capacitor in accordance with the first embodiment.

FIG. 4 is an exploded perspective view of the capacitor body L1 in a modified example of the multilayer feedthrough capacitor C1 in accordance with the first embodiment. In the modified example of the multilayer feedthrough capacitor C1 in accordance with the first embodiment, as shown in FIG. 4, the first grounding main electrode portions 21, 41 have areas different from those of the second grounding main electrode portions 23, 43 in the grounding inner electrodes 20, 40. Further, the first signal main electrode portions 31, 51 have areas different from those of the second signal main electrode portions 33, 53 in the signal inner electrodes 30, 50.

Specifically, the first grounding main electrode portions 21, 41 have areas smaller than those of the second grounding main electrode portions 23, 43. The first signal main electrode portions 31, 51 have areas smaller than those of the second signal main electrode portions 33, 53. The first grounding main electrode portions 21, 41 have substantially the same areas as those of the first signal main electrode portions 31, 51 and oppose the first signal main electrode portions 31, 51 along the opposing direction of the first and second main faces L1a, L1b. The second grounding main electrode portions 23, 43 have substantially the same areas as those of the second signal main electrode portions 33, 53 and oppose the second signal main electrode portions 33, 53 along the opposing direction of the first and second main faces L1a, L1b.

In this case, the capacitance formed by the first grounding main electrode portions 21, 41 and first signal main electrode portions 31, 51 opposing each other and the capacitance formed by the second grounding main electrode portions 23, 43 and second signal main electrode portions 33, 53 opposing each other have magnitudes different from each other. Therefore, a plurality of capacitances having magnitudes different from each other are formed in the multilayer feedthrough capacitor.

Figure 5:
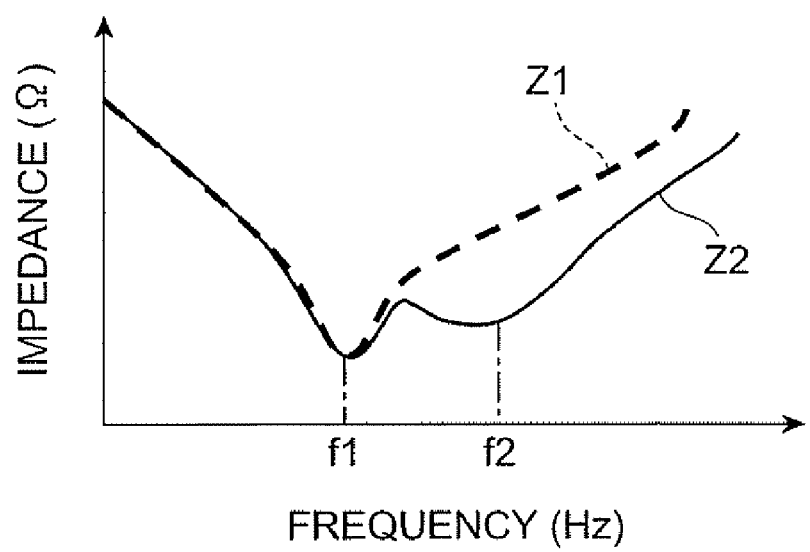
FIG. 5 is a graph showing the frequency characteristic of impedance in the modified example of the multilayer feedthrough capacitor in accordance with the first embodiment.

FIG. 5 is a graph showing respective impedance (Ω) characteristics of the multilayer feedthrough capacitor C1 in accordance with the first embodiment and the modified example of the multilayer feedthrough capacitor C1 in accordance with the first embodiment with respect to frequency (Hz). In the graph shown in FIG. 5, the abscissa and ordinate indicate the frequency (Hz) and impedance (Ω), respectively.

In FIG. 5, curve Z1 represented by a dotted line corresponds to the multilayer feedthrough capacitor C1 in accordance with the first embodiment, while curve Z2 represented by a solid line corresponds to the modified example of the multilayer feedthrough capacitor C1 in accordance with the first embodiment. The multilayer feedthrough capacitor C1 in accordance with the first embodiment is formed with two capacitances having the same value, and thus has a point where the impedance becomes a local minimum only at a resonance frequency f1 corresponding to this capacitance value as illustrated by the curve Z1 in FIG. 5. On the other hand, the modified example of the multilayer feedthrough capacitor C1 in accordance with the first embodiment is formed with two capacitances having values different from each other, and thus has points where the impedance becomes local minima at both of different resonance frequencies f1, f2 as illustrated by the curve Z2 in FIG. 5. Thus, the modified example of the multilayer feedthrough capacitor C1 has two capacitances different from each other and consequently can lower the impedance over a wider frequency range than in the case with one capacitance.

Second Embodiment

Figure 6:
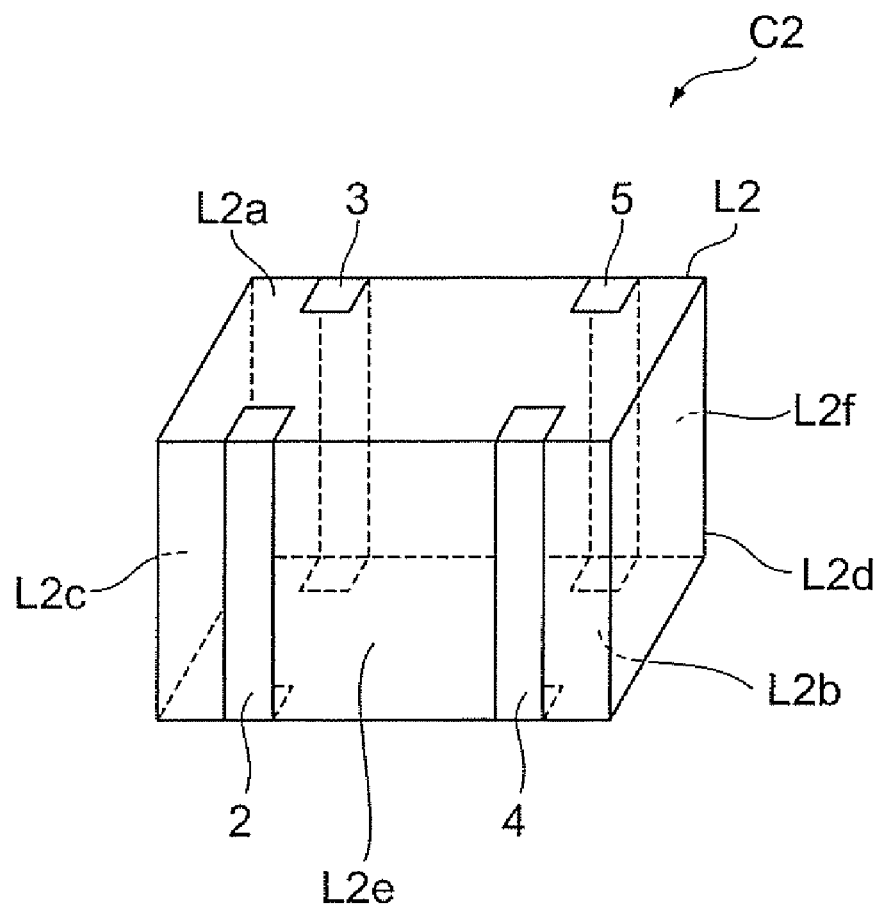
FIG. 6 is a perspective view of the multilayer feedthrough capacitor in accordance with the second embodiment.
Figure 7:
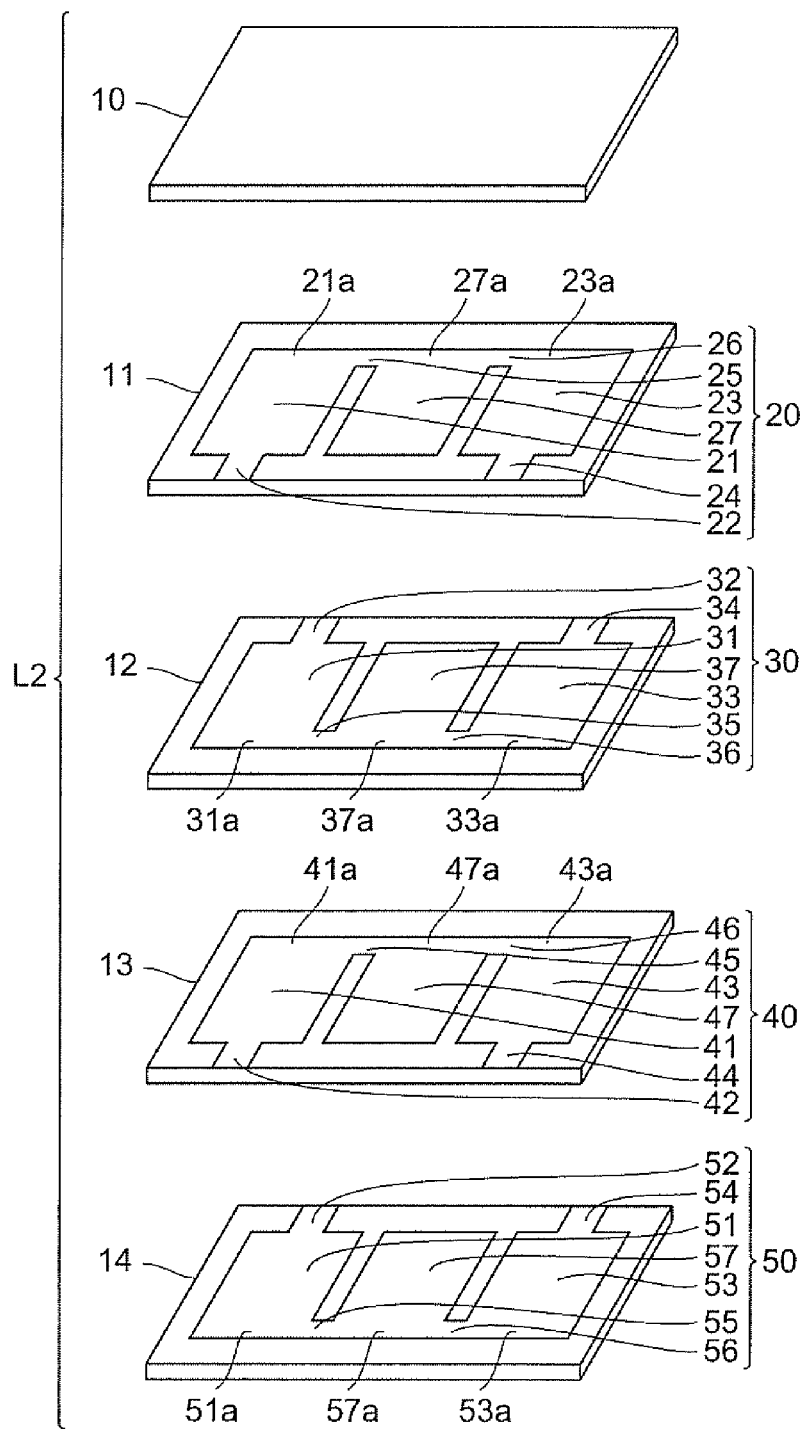
FIG. 7 is an exploded perspective view of the capacitor body included in the multilayer feedthrough capacitor in accordance with the second embodiment.
Figure 10:
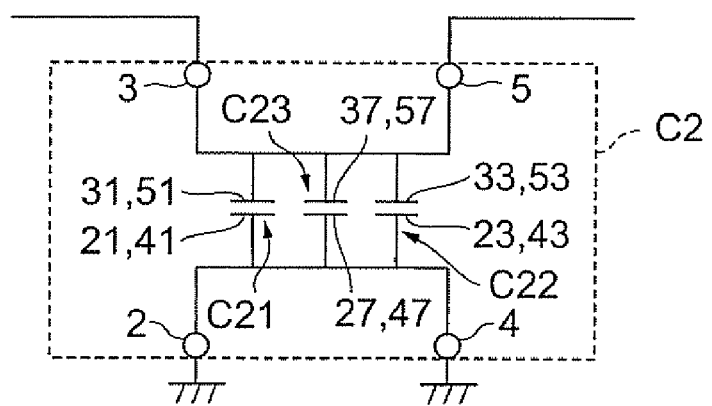
FIG. 10 is an equivalent circuit diagram of the multilayer feedthrough capacitor in accordance with the second embodiment.

With reference to FIGS. 6, 7, and 10, the structure of the multilayer feedthrough capacitor C2 in accordance with the second embodiment will be explained. The multilayer feedthrough capacitor C2 in accordance with the second embodiment differs from the multilayer feedthrough capacitor C1 in accordance with the first embodiment in terms of forms of grounding inner electrodes and signal inner electrodes. FIG. 6 is a perspective view of the multilayer feedthrough capacitor in accordance with the second embodiment. FIG. 7 is an exploded perspective view of the capacitor body included in the multilayer feedthrough capacitor in accordance with the second embodiment. FIG. 10 is an equivalent circuit diagram of the multilayer feedthrough capacitor in accordance with the second embodiment.

As shown in FIG. 6, the multilayer feedthrough capacitor C2 in accordance with the second embodiment comprises a capacitor body L2, first and second grounding terminal electrodes 2, 4 arranged on outer surface of the capacitor body L2, and first and second signal terminal electrodes 3, 5 arranged on the outer surface of the capacitor body L2.

As shown in FIG. 6, the capacitor body L2 is shaped like a rectangular parallelepiped and includes rectangular first and second main faces L2a, L2b opposing each other, first and second end faces L2c, L2d extending in the shorter-side direction of the first and second main faces L2a, L2b so as to connect the first and second main faces L2a, L2b to each other and opposing each other, and first and second side faces L2e, L2f extending in the longer-side direction of the first and second main faces L2a, L2b so as to connect the first and second main faces L2a, L2b to each other and opposing each other.

The first and second grounding terminal electrodes 2, 4 are successively arranged on the first side face L2e from the first end face L2c side to the second end face L2d side. The first and second signal terminal electrodes 3, 5 are successively arranged on the second side face L2f from the first end face L2c side to the second end face L2d side.

As shown in FIG. 7, the capacitor body L2 includes a plurality of (5 in this embodiment) laminated dielectric layers 10 to 14. As shown in FIG. 7, a plurality (2 layers in this embodiment) of grounding inner electrodes 20, 40 are alternately arranged with a plurality (2 layers in this embodiment) of signal inner electrodes 30, 50.

The grounding inner electrodes 20, 40 and the signal inner electrodes 30, 50 oppose each other in the opposing direction of the first and second main faces L2a, L2b, with their corresponding one of the dielectric layers 11, 12, 13 therebetween, the dielectric layers 11, 12, 13 being portions of the capacitor body L2.

The grounding inner electrodes 20, 40 include rectangular first to third grounding main electrode portions 21, 41, 23, 43, 27, 47 whose longer sides extend in the shorter-side direction of the first and second main faces L2a, L2b of the capacitor body L2, first and second grounding lead electrode portions 22, 42, 24, 44 extending from the first and second grounding main electrode portions 21, 41, 23, 43 to the first side face L2e, and rectangular first and second grounding connection electrode portions 25, 26, 45, 46 whose longer sides extend in the longer-side direction of the first and second main faces L2a, L2b of the capacitor body L2.

The first to third grounding main electrode portions 21, 41, 23, 43, 26, 46 are positioned separately from each other in the order of the first grounding main electrode portions 21, 41, third grounding main electrode portions 27, 47, and second grounding main electrode portions 23, 43 along the opposing direction of the first and second end faces L2c, L2d.

The first grounding lead electrode portions 22, 42 extend from the first grounding main electrode portions 21, 41 so as to be exposed at the first side face L2e and physically and electrically connected to the first grounding terminal electrode 2. The second grounding lead electrode portions 24, 44 extend from the second grounding main electrode portions 23, 43 so as to be exposed at the first side face L2e and physically and electrically connected to the second grounding terminal electrode 4.

The first grounding connection electrode portions 25, 45 are positioned between the first grounding main electrode portions 21, 41 and third grounding main electrode portions 27, 47, so as to connect the first grounding main electrode portions 21, 41 to the third grounding main electrode portions 27, 47. The second grounding connection electrode portions 26, 46 are positioned between the second grounding main electrode portions 23, 43 and third grounding main electrode portions 27, 47, so as to connect the second grounding main electrode portions 23, 43 to the third grounding main electrode portions 27, 47. Namely, the first and second grounding connection electrode portions 25, 45, 26, 46 are positioned between the first grounding main electrode portions 21, 41 and second grounding main electrode portions 23, 43.

The first and second grounding connection electrode portions 25, 45, 26, 46 extend in the opposing direction of the first and second end faces L2c, L2d.

The first grounding connection electrode portion 25 connects an end portion 21a of the first grounding main electrode portion 21 on the second side face L2f side to an end portion 27a of the third grounding main electrode portion 27 on the second side face L2f side. The second grounding connection electrode portion 26 connects an end portion 23a of the second grounding main electrode portion 23 on the second side face L2f side to the end portion 27a of the third grounding main electrode portion 27 on the second side face L2f side. Namely, the first and second grounding connection electrode portions 25, 26 connect the respective end portions 21a, 23a, 27a of the first to third grounding main electrode portions 21, 23, 27 on the second side face L2f side.

The first grounding connection electrode portion 45 connects an end portion 41a of the first grounding main electrode portion 41 on the second side face L2f side to an end portion 47a of the third grounding main electrode portion 47 on the second side face L2f side. The second grounding connection electrode portion 46 connects an end portion 43a of the second grounding main electrode portion 43 on the second side face L2f side to the end portion 47a of the third grounding main electrode portion 47 on the second side face L2f side. Namely, the first and second grounding connection electrode portions 45, 46 connect the respective end portions 41a, 43a, 47a of the first to third grounding main electrode portions 41, 43, 47 on the second side face L2f side.

The signal inner electrodes 30, 50 include rectangular first to third signal main electrode portions 31, 51, 33, 53, 37, 57 whose longer sides extend in the shorter-side direction of the first and second main faces L2a, L2b of the capacitor body L2, first and second signal lead electrode portions 32, 52, 34, 54 extending from the first and second signal main electrode portions 31, 51, 33, 53 to the second side face L2f, and rectangular first and second signal connection electrode portions 35, 36, 55, 56 whose longer sides extend in the longer-side direction of the first and second main faces L2a, L2b of the capacitor body L2.

The first to third signal main electrode portions 31, 51, 33, 53, 36, 56 are positioned separately from each other in the order of the first signal main electrode portions 31, 51, third signal main electrode portions 37, 57, and second signal main electrode portions 33, 53 along the opposing direction of the first and second end faces L2c, L2d.

The first signal lead electrode portions 32, 52 extend from the first signal main electrode portions 31, 51 so as to be exposed at the second side face L2f and physically and electrically connected to the first signal terminal electrode 3. The second signal lead electrode portions 34, 54 extend from the second signal main electrode portions 33, 53 so as to be exposed at the second side face L2f and physically and electrically connected to the second signal terminal electrode 5.

The first signal connection electrode portions 35, 55 are positioned between the first signal main electrode portions 31, 51 and third signal main electrode portions 37, 57, so as to connect the first signal main electrode portions 31, 51 to the third signal main electrode portions 37, 57. The second signal connection electrode portions 36, 56 are positioned between the second signal main electrode portions 33, 53 and third signal main electrode portions 37, 57, so as to connect the second signal main electrode portions 33, 53 to the third signal main electrode portions 37, 57. Namely, the first and second signal connection electrode portions 35, 55, 36, 56 are positioned between the first signal main electrode portions 31, 51 and second signal main electrode portions 33, 53.

The first and second signal connection electrode portions 35, 55, 36, 56 extend in the opposing direction of the first and second end faces L2c, L2d.

The first signal connection electrode portion 35 connects an end portion 31a of the first signal main electrode portion 31 on the first side face L2e side to an end portion 37a of the third signal main electrode portion 37 on the first side face L2e side. The second signal connection electrode portion 36 connects an end portion 33a of the second signal main electrode portion 33 on the first side face L2e side to the end portion 37a of the third signal main electrode portion 37 on the first side face L2e side. Namely, the first and second signal connection electrode portions 35, 36 connect the respective end portions 31a, 33a, 37a of the first to third signal main electrode portions 31, 33, 37 on the first side face L2e side.

The first signal connection electrode portion 55 connects an end portion 51a of the first signal main electrode portion 51 on the first side face L2e side to an end portion 57a of the third signal main electrode portion 57 on the first side face L2e side. The second signal connection electrode portion 56 connects an end portion 53a of the second signal main electrode portion 53 on the first side face L2e side to the end portion 57a of the third signal main electrode portion 57 on the first side face L2e side. Namely, the first and second signal connection electrode portions 55, 56 connect the respective end portions 51a, 53a, 57a of the first to third signal main electrode portions 51, 53, 57 on the first side face L2e side.

When seen in the opposing direction of the first and second main faces L2a, L2b, the first grounding connection electrode portions 25, 45 and the first signal connection electrode portions 35, 55 are separated from each other in the opposing direction of the first and second side faces L2e, L2f. When seen in the opposing direction of the first and second main faces L2a, L2b, the second grounding connection electrode portions 26, 46 and the first signal connection electrode portions 36, 56 are separated from each other in the opposing direction of the first and second side faces L2e, L2f.

The first grounding main electrode portion 21 and first signal main electrode portion 31 oppose each other, with the dielectric layer 11 therebetween. The second grounding main electrode portion 23 and second signal main electrode portion 33 oppose each other, with the dielectric layer 11 therebetween. The third grounding main electrode portion 27 and third signal main electrode portion 37 oppose each other, with the dielectric layer 11 therebetween. On the other hand, the first and second grounding connection electrode portions 25, 26 have no areas opposing the signal inner electrode 30. The first and second signal connection electrode portions 35, 36 have no areas opposing the grounding inner electrode 20.

The first signal main electrode portion 31 and first grounding main electrode portion 41 oppose each other, with the dielectric layer 12 therebetween. The second signal main electrode portion 33 and second grounding main electrode portion 43 oppose each other, with the dielectric layer 12 therebetween. The third signal main electrode portion 37 and third grounding main electrode portion 47 oppose each other, with the dielectric layer 12 therebetween. On the other hand, the first and second signal connection electrode portions 35, 36 have no areas opposing the grounding inner electrode 40. The first and second grounding connection electrode portions 45, 46 have no areas opposing the signal inner electrode 30.

The first grounding main electrode portion 41 and first signal main electrode portion 51 oppose each other, with the dielectric layer 13 therebetween. The second grounding main electrode portion 43 and second signal main electrode portion 53 oppose each other, with the dielectric layer 13 therebetween. The third grounding main electrode portion 47 and third signal main electrode portion 57 oppose each other, with the dielectric layer 13 therebetween. On the other hand, the first and second grounding connection electrode portions 45, 46 have no areas opposing the signal inner electrode 50. The first and second signal connection electrode portions 55, 56 have no areas opposing the grounding inner electrode 40.

FIG. 10 is an equivalent circuit diagram of the multilayer feedthrough capacitor C2. FIG. 10 illustrates a case where the first and second grounding terminal electrodes 2, 4 are grounded, whereas the first and second signal terminal electrodes 3, 5 are connected to signal leads. In the multilayer feedthrough capacitor C2, the first grounding main electrode portions 21, 41 of the grounding inner electrodes 20, 40 and the first signal main electrode portions 31, 51 of the signal inner electrodes 30, 50 oppose each other, thereby forming a capacitance C21. The second grounding main electrode portions 23, 43 of the grounding inner electrodes 20, 40 and the second signal main electrode portions 33, 53 of the signal inner electrodes 30, 50 oppose each other, thereby forming a capacitance C22. The third grounding main electrode portions 27, 47 of the grounding inner electrodes 20, 40 and the third signal main electrode portions 37, 57 of the signal inner electrodes 30, 50 oppose each other, thereby forming a capacitance C23.

On the other hand, the first and second grounding connection electrode portions 25, 45, 26, 46 of the grounding inner electrodes 20, 40 have no areas opposing any of the signal inner electrodes 30, 50. The first and second signal connection electrode portions 35, 55, 36, 56 of the signal inner electrodes 30, 50 have no areas opposing any of the grounding inner electrodes 20, 40.

Therefore, as shown in FIG. 10, the multilayer feedthrough capacitor C2 can realize a circuit in which three capacitors having the respective capacitances C21, C22, C23 are connected in parallel.

In the multilayer feedthrough capacitor C2, the first grounding connection electrode portions 25, 45 and the first signal connection electrode portions 35, 55 are formed so as to be separated from each other in the opposing direction of the first and second side faces L2e, L2f. Therefore, a plurality of capacitances C21, C22 formed in the multilayer feedthrough capacitor C2 are favorably separated from each other.

Also, in the multilayer feedthrough capacitor C2, the second grounding connection electrode portions 26, 46 and the second signal connection electrode portions 36, 56 are formed so as to be separated from each other in the opposing direction of the first and second side faces L2e, L2f. Therefore, a plurality of capacitances C22, C23 formed in the multilayer feedthrough capacitor C2 are favorably separated from each other.

In the multilayer feedthrough capacitor C2 in particular, the first and second grounding connection electrode portions 25, 45, 26, 46 are arranged on the second side face L2f side, while the first and second signal connection electrode portions 35, 55, 36, 56 are arranged on the first side face L2e side. Thus, the connection electrode portions are arranged closer to the side faces of the capacitor body L2 on the sides opposite from each other, whereby a sufficiently large distance can physically be obtained between the grounding connection electrode portions 25, 45, 26, 46 and signal connection electrode portions 35, 55, 36, 56. Therefore, the multilayer feedthrough capacitor C2 can separate a plurality of capacitances C21, C22, C23 more favorably from each other.

Third Embodiment

Figure 8:
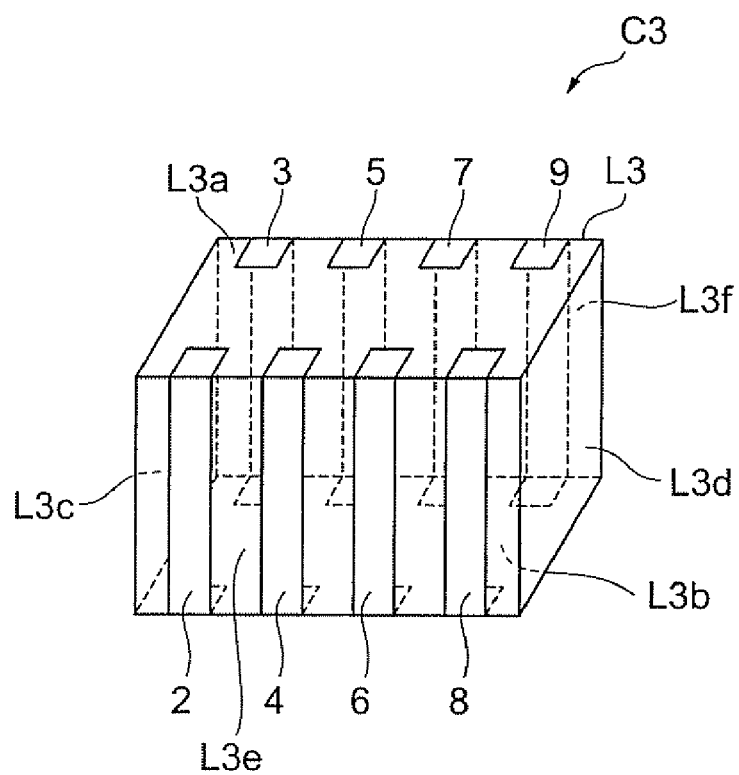
FIG. 8 is a perspective view of the multilayer feedthrough capacitor in accordance with the third embodiment.
Figure 9:
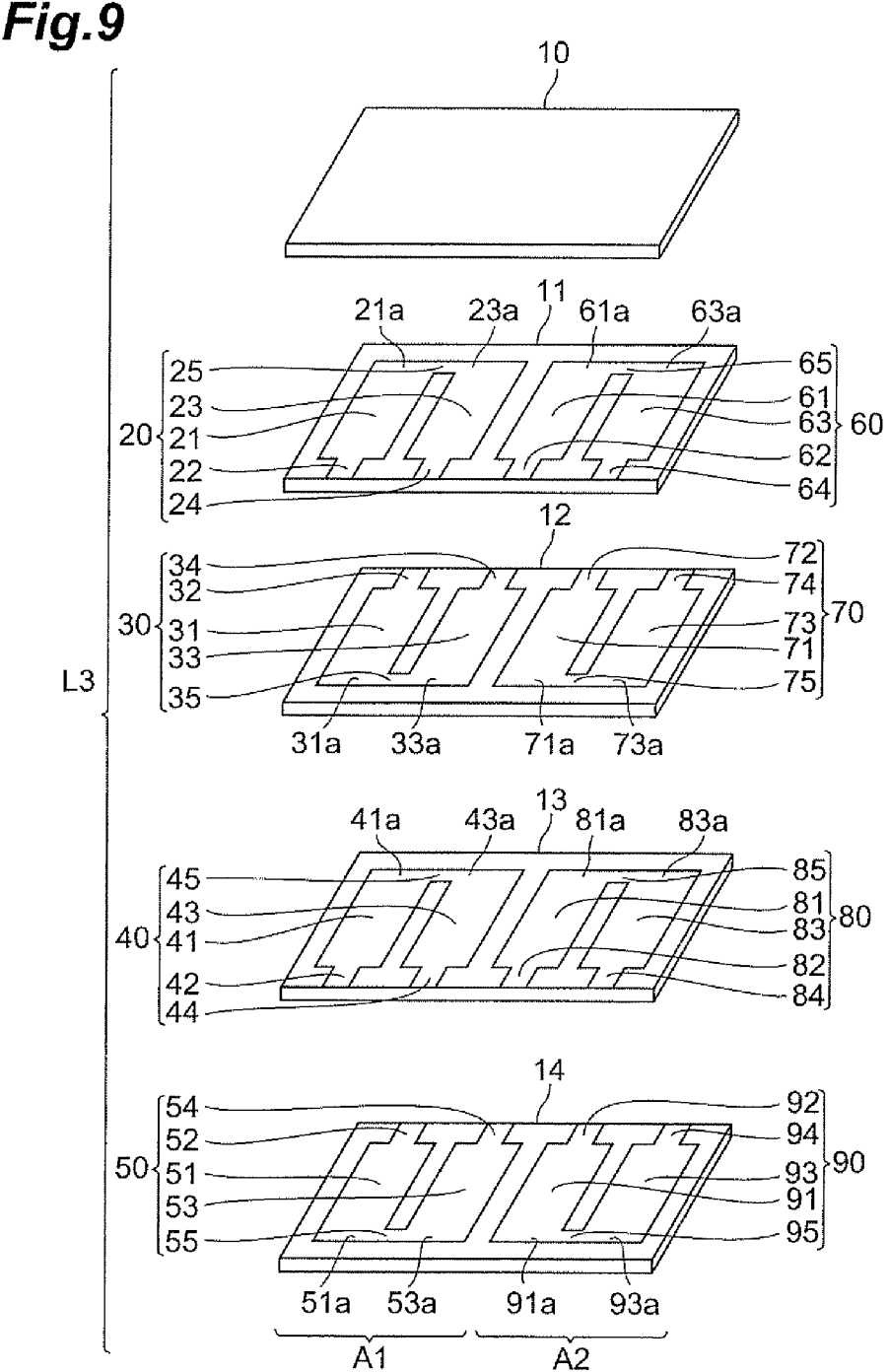
FIG. 9 is an exploded perspective view of the capacitor body included in the multilayer feedthrough capacitor in accordance with the third embodiment.

With reference to FIGS. 8 and 9, the structure of the multilayer feedthrough capacitor C3 in accordance with the third embodiment will be explained. The multilayer feedthrough capacitor in accordance with the third embodiment differs from the multilayer feedthrough capacitor in accordance with the first embodiment in terms of the number of terminal electrodes and the number of inner electrodes. FIG. 8 is a perspective view of the multilayer feedthrough capacitor in accordance with the third embodiment. FIG. 9 is an exploded perspective view of the capacitor body included in the multilayer feedthrough capacitor in accordance with the third embodiment.

As shown in FIG. 8, the multilayer feedthrough capacitor C3 in accordance with the third embodiment comprises a capacitor body L3, first and second grounding terminal electrodes 2, 6, 4, 8 arranged on outer surface of the capacitor body L3, and first and second signal terminal electrodes 3, 7, 5, 9 arranged on the outer surface of the capacitor body L3.

As shown in FIG. 8, the capacitor body L3 is shaped like a rectangular parallelepiped and includes rectangular first and second main faces L3a, L3b opposing each other, first and second end faces L3c, L3d extending in the shorter-side direction of the first and second main faces L3a, L3b so as to connect the first and second main faces L3a, L3b to each other and opposing each other, and first and second side faces L3e, L3f extending in the longer-side direction of the first and second main faces L3a, L3b so as to connect the first and second main faces L3a, L3b to each other and opposing each other.

The first and second grounding terminal electrodes 2, 6, 4, 8 are arranged on the first side face L3e of the capacitor body L3. The first and second grounding terminal electrodes 2, 6, 4, 8 are arranged on the first side face L3e in the order of the first grounding terminal electrode 2, second grounding terminal electrode 4, first grounding terminal electrode 6, and second grounding terminal electrode 8 from the first end face L3c side to the second end face L3d side.

The first and second signal terminal electrodes 3, 7, 5, 9 are arranged on the second side face L3f of the capacitor body L3. The first and second signal terminal electrodes 3, 7, 5, 9 are arranged on the second side face L3f in the order of the first signal terminal electrode 3, second signal terminal electrode 5, first signal terminal electrode 7, and second signal terminal electrode 9 from the first end face L3c side to the second end face L3d side.

As shown in FIG. 9, the capacitor body L3 includes a plurality (5 layers in this embodiment) of dielectric layers 10 to 14. The capacitor body L3 is arranged with first and second electrode groups A1, A2. The first electrode group A1 has a plurality (2 layers in this embodiment) of grounding inner electrodes 20, 40 and a plurality (2 layers in this embodiment) of signal inner electrodes 30, 50. The second electrode group A2 has a plurality (2 layers in this embodiment) of grounding inner electrodes 60, 80 and a plurality (2 layers in this embodiment) of signal inner electrodes 70, 90. The first electrode group A1 and second electrode group A1 are arranged in a row along the opposing direction of the first and second end faces L3c, L3d. Specifically, the first and second electrode groups A1, A2 are arranged on the sides of the first and second end faces L3c, L3d, respectively. The inner electrodes 20, 30, 40, 50, 60, 70, 80, 90 are constituted by sintered bodies of a conductive paste, for example.

The grounding inner electrodes 20 and 60 are arranged at the same position in the opposing direction of the first and second main faces L3a, L3b. The grounding inner electrodes 40 and 80 are arranged at the same position in the opposing direction of the first and second main faces L3a, L3b. The signal inner electrodes 30 and 70 are arranged at the same position in the opposing direction of the first and second main faces L3a, L3b. The signal inner electrodes 50 and 90 are arranged at the same position in the opposing direction of the first and second main faces L3a, L3b.

The grounding inner electrodes 20, 60 and the signal inner electrodes 30, 70 oppose each other in the opposing direction of the first and second main faces L3a, L3b, with the dielectric layer 11 therebetween. The signal inner electrodes 30, 70 and the grounding inner electrodes 40, 80 oppose each other in the opposing direction of the first and second main faces L3a, L3b, with the dielectric layer 12 therebetween. The grounding inner electrodes 40, 80 and the signal inner electrodes 50, 90 oppose each other in the opposing direction of the first and second main faces L3a, L3b, with the dielectric layer 13 therebetween.

The grounding inner electrodes 20, 60, 40, 80 include rectangular first and second grounding main electrode portions 21, 41, 61, 81, 23, 43, 63, 83 whose longer sides extend in the shorter-side direction of the first and second main faces L3a, L3b of the capacitor body L3, first and second grounding lead electrode portions 22, 42, 62, 82, 24, 44, 64, 84 extending from the first and second grounding main electrode portions 21, 41, 61, 81, 23, 43, 63, 83 to the first side face L3e, and rectangular grounding connection electrode portions 25, 45, 65, 85 whose longer sides extend in the longer-side direction of the first and second main faces L3a, L3b of the capacitor body L3.

The first and second grounding main electrode portions 21, 41, 61, 81, 23, 43, 63, 83 are positioned separately from each other in the order of the first grounding main electrode portions 21, 41, 61, 81 and second grounding main electrode portions 23, 43, 63, 83 along the opposing direction of the first and second end faces L3c, L3d. The first grounding main electrode portions 21, 41, 61, 81 have forms substantially identical to those of the second grounding main electrode portions 23, 43, 63, 83.

The first grounding lead electrode portions 22, 42 extend from the first grounding main electrode portions 21, 41 so as to be exposed at the first side face L3e and physically and electrically connected to the first grounding terminal electrode 2. The first grounding lead electrode portions 62, 82 extend from the first grounding main electrode portions 61, 81 so as to be exposed at the first side face L3e and physically and electrically connected to the first grounding terminal electrode 6. The second grounding lead electrode portions 24, 44 extend from the second grounding main electrode portions 22, 42 so as to be exposed at the first side face L3e and physically and electrically connected to the second grounding terminal electrode 4. The second grounding lead electrode portions 64, 84 extend from the second grounding main electrode portions 63, 83 so as to be exposed at the first side face L3e and physically and electrically connected to the second grounding terminal electrode 8.

The grounding connection electrode portions 25, 45, 65, 85 are positioned between the first grounding main electrode portions 21, 41, 61, 81 and second grounding main electrode portions 23, 43, 63, 83, so as to connect the first grounding main electrode portions 21, 41, 61, 81 to the second grounding main electrode portions 23, 43, 63, 83. The grounding connection electrode portions 25, 45, 65, 85 extend in the opposing direction of the first and second end faces L3c, L3d.

The grounding connection electrode portion 25 connects an end portion 21a of the first grounding main electrode portion 21 on the second side face L3f side to an end portion 23a of the second grounding main electrode portion 23 on the second side face L3f side. The grounding connection electrode portion 45 connects an end portion 41a of the first grounding main electrode portion 41 on the second side face L3f side to an end portion 43a of the second grounding main electrode portion 43 on the second side face L3f side. The grounding connection electrode portion 65 connects an end portion 61a of the first grounding main electrode portion 61 on the second side face L3f side to an end portion 63a of the second grounding main electrode portion 63 on the second side face L3f side. The grounding connection electrode portion 85 connects an end portion 81a of the first grounding main electrode portion 81 on the second side face L3f side to an end portion 83a of the second grounding main electrode portion 83 on the second side face L3f side.

The signal inner electrodes 30, 50, 70, 90 include rectangular first and second signal main electrode portions 31, 51, 71, 91, 33, 53, 73, 93 whose longer sides extend in the shorter-side direction of the first and second main faces L3a, L3b of the capacitor body L3, first and second signal lead electrode portions 32, 52, 72, 92, 34, 54, 74, 94 extending from the first and second signal main electrode portions 31, 51, 71, 91, 33, 53, 73, 93 to the second side face L3f, and rectangular signal connection electrode portions 35, 55, 75, 95 whose longer sides extend in the longer-side direction of the first and second main faces L3a, L3b of the capacitor body L3.

The first and second signal main electrode portions 31, 51, 71, 91, 33, 53, 73, 93 are positioned separately from each other in the order of the first signal main electrode portions 31, 51, 71, 91 and second signal main electrode portions 33, 53, 73, 93 along the opposing direction of the first and second end faces L3c, L3d. The first signal main electrode portions 31, 51, 71, 91 have forms substantially identical to those of the second signal main electrode portions 33, 53, 73, 93.

The first signal lead electrode portions 32, 52 extend from the first signal main electrode portions 31, 51 so as to be exposed at the second side face L3f and physically and electrically connected to the first signal terminal electrode 3. The first signal lead electrode portions 72, 92 extend from the first signal main electrode portions 71, 91 so as to be exposed at the second side face L3f and physically and electrically connected to the first signal terminal electrode 7. The second signal lead electrode portions 34, 54 extend from the second signal main electrode portions 33, 53 so as to be exposed at the second side face L3f and physically and electrically connected to the second signal terminal electrode 5. The second signal lead electrode portions 74, 94 extend from the second signal main electrode portions 73, 93 so as to be exposed at the second side face L3f and physically and electrically connected to the second signal terminal electrode 9.

The signal connection electrode portions 35, 55, 75, 95 are positioned between the first signal main electrode portions 31, 51, 71, 91 and second signal main electrode portions 33, 53, 73, 93, so as to connect the first signal main electrode portions 31, 51, 71, 91 to the second signal main electrode portions 33, 53, 73, 93. The signal connection electrode portions 35, 55, 75, 95 extend in the opposing direction of the first and second end faces L3c, L3d.

The signal connection electrode portion 35 connects an end portion 31a of the first signal main electrode portion 31 on the first side face L3e side to an end portion 33a of the second signal main electrode portion 33 on the first side face L3e side. The signal connection electrode portion 55 connects an end portion 51a of the first signal main electrode portion 51 on the first side face L3e side to an end portion 53a of the second signal main electrode portion 53 on the first side face L3e side. The signal connection electrode portion 75 connects an end portion 71a of the first signal main electrode portion 71 on the first side face L3e side to an end portion 73a of the second signal main electrode portion 73 on the first side face L3e side. The signal connection electrode portion 95 connects an end portion 91a of the first signal main electrode portion 91 on the first side face L3e side to an end portion 93a of the second signal main electrode portion 93 on the first side face L3e side.

When seen in the opposing direction of the first and second main faces L3a, L3b, the grounding connection electrode portions 25, 45 and the signal connection electrode portions 35, 55 are separated from each other in the opposing direction of the first and second side faces L3e, L3f. When seen in the opposing direction of the first and second main faces L3a, L3b, the grounding connection electrode portions 65, 85 and the signal connection electrode portions 75, 85 are separated from each other in the opposing direction of the first and second side faces L3e, L3f.

The first grounding main electrode portion 21 and first signal main electrode portion 31 oppose each other, with the dielectric layer 11 therebetween. The second grounding main electrode portion 23 and second signal main electrode portion 33 oppose each other, with the dielectric layer 11 therebetween. On the other hand, the grounding connection electrode portion 25 has no area opposing the signal inner electrode 30. The signal connection electrode portion 35 has no area opposing the grounding inner electrode 20.

The first signal main electrode portion 31 and first grounding main electrode portion 41 oppose each other, with the dielectric layer 12 therebetween. The second signal main electrode portion 33 and second grounding main electrode portion 43 oppose each other, with the dielectric layer 12 therebetween. On the other hand, the signal connection electrode portion 35 has no area opposing the grounding inner electrode 40. The grounding connection electrode portion 45 has no area opposing the signal inner electrode 30.

The first grounding main electrode portion 41 and first signal main electrode portion 51 oppose each other, with the dielectric layer 13 therebetween. The second grounding main electrode portion 43 and second signal main electrode portion 53 oppose each other, with the dielectric layer 13 therebetween. On the other hand, the grounding connection electrode portion 45 has no area opposing the signal inner electrode 50. The signal connection electrode portion 55 has no area opposing the grounding inner electrode 40.

The first grounding main electrode portion 61 and first signal main electrode portion 71 oppose each other, with the dielectric layer 11 therebetween. The second grounding main electrode portion 63 and second signal main electrode portion 73 oppose each other, with the dielectric layer 11 therebetween. On the other hand, the grounding connection electrode portion 65 has no area opposing the signal inner electrode 70. The signal connection electrode portion 75 has no area opposing the grounding inner electrode 60.

The first signal main electrode portion 71 and first grounding main electrode portion 81 oppose each other, with the dielectric layer 12 therebetween. The second signal main electrode portion 73 and second grounding main electrode portion 83 oppose each other, with the dielectric layer 12 therebetween. On the other hand, the signal connection electrode portion 75 has no area opposing the grounding inner electrode 80. The grounding connection electrode portion 85 has no area opposing the signal inner electrode 70.

The first grounding main electrode portion 81 and first signal main electrode portion 91 oppose each other, with the dielectric layer 13 therebetween. The second grounding main electrode portion 83 and second signal main electrode portion 93 oppose each other, with the dielectric layer 13 therebetween. On the other hand, the grounding connection electrode portion 85 has no area opposing the signal inner electrode 90. The signal connection electrode portion 95 has no area opposing the grounding inner electrode 80.

In the multilayer feedthrough capacitor C3, the first grounding main electrode portions 21, 41 of the grounding inner electrodes 20, 40 and the first signal main electrode portions 31, 51 of the signal inner electrodes 30, 50, which are included in the first electrode group A1, oppose each other, thereby forming a capacitance. Also, the second grounding main electrode portions 23, 43 of the grounding inner electrodes 20, 40 and the second signal main electrode portions 33, 53 of the signal inner electrodes 30, 50, which are included in the first electrode group A1, oppose each other, thereby forming a capacitance. On the other hand, the grounding connection electrode portions 25, 45 of the grounding inner electrodes 20, 40 have no areas opposing any of the signal inner electrodes 30, 50. The signal connection electrode portions 35, 55 of the signal inner electrodes 30, 50 have no areas opposing any of the grounding inner electrodes 20, 40.

Therefore, the first electrode group A1 of the multilayer feedthrough capacitor C3 can realize a circuit in which two capacitors having respective capacitances are connected in parallel.

In the multilayer feedthrough capacitor C3, the first grounding main electrode portions 61, 81 of the grounding inner electrodes 60, 80 and the first signal main electrode portions 71, 91 of the signal inner electrodes 70, 90, which are included in the second electrode group A2, oppose each other, thereby forming a capacitance. Also, the second grounding main electrode portions 63, 83 of the grounding inner electrodes 60, 80 and the second signal main electrode portions 73, 93 of the signal inner electrodes 70, 90, which are included in the second electrode group M, oppose each other, thereby forming a capacitance. On the other hand, the grounding connection electrode portions 65, 85 of the grounding inner electrodes 60, 80 have no areas opposing any of the signal inner electrodes 70, 90. The signal connection electrode portions 75, 95 of the signal inner electrodes 70, 90 have no areas opposing any of the grounding inner electrodes 60, 80.

Therefore, the second electrode group A2 of the multilayer feedthrough capacitor C3 can realize a circuit in which two capacitors having respective capacitances are connected in parallel.

Thus, the multilayer feedthrough capacitor C3 is a capacitor array having two capacitor groups each containing two capacitors connected in parallel.

In the multilayer feedthrough capacitor C3, the grounding connection electrode portions 25, 45 and the signal connection electrode portions 35, 55 are formed so as to be separated from each other. Therefore, a plurality of capacitances formed by the first electrode group A1 in the multilayer feedthrough capacitor C3 are favorably separated from each other.

In the first electrode group A1 in the multilayer feedthrough capacitor C3 in particular, the grounding connection electrode portions 25, 45 are arranged on the second side face L3$f$ side, while the signal connection electrode portions 35, 55 are arranged on the first side face L3$e$ side. Thus, the connection electrode portions are arranged closer to the side faces of the capacitor body L3 on the sides opposite from each other, whereby a sufficiently large distance can physically be obtained between the grounding connection electrode portions 25, 45 and signal connection electrode portions 35, 55. Therefore, the first electrode group A1 of the multilayer feedthrough capacitor C3 can separate a plurality of capacitances more favorably from each other.

Also, the grounding connection electrode portions 65, 85 and the signal connection electrode portions 75, 95 are formed so as to be separated from each other. Therefore, a plurality of capacitances formed by the second electrode group A2 in the multilayer feedthrough capacitor C3 are favorably separated from each other.

In the first electrode group A2 in the multilayer feedthrough capacitor C3 in particular, the grounding connection electrode portions 65, 85 are arranged on the second side face L3$f$ side, while the signal connection electrode portions 75, 95 are arranged on the first side face L3$e$ side. Thus, the connection electrode portions are arranged closer to the side faces of the capacitor body L3 on the sides opposite from each other, whereby a sufficiently large distance can physically be obtained between the grounding connection electrode portions 65, 85 and signal connection electrode portions 75, 95. Therefore, the second electrode group A2 of the multilayer feedthrough capacitor C3 can separate a plurality of capacitances more favorably from each other.

Though the preferred embodiments of the present invention are explained in detail in the foregoing, the present invention is not limited to the above-mentioned embodiments. For example, the numbers of grounding main electrode portions and grounding connection electrode portions included in the grounding inner electrodes 20, 40, 60, 80 are not limited to those described in the above-mentioned embodiments and modified example. The numbers of signal main electrode portions and signal connection electrode portions included in the signal inner electrodes 30, 50, 70, 90 are not limited to those described in the above-mentioned embodiments and modified example.

Forms of the grounding inner electrodes 20, 40, 60, 80 and signal inner electrodes 30, 50, 70, 90 are not limited to those described in the above-mentioned embodiments and modified example. Therefore, the first and second main electrode portions included in each inner electrode may have areas different from each other in the multilayer feedthrough capacitors C2, C3 in accordance with the second and third embodiments for example. The connection electrode portions are not required to connect end portions of main electrode portions, but may connect center portions, for example. The connection electrode portions may be positioned on side face sides opposite from those shown in the embodiments and modified example.

The numbers of laminations of dielectric layers and inner electrodes included in the capacitor body are not limited to those described in the embodiments and modified example. The number of electrode groups included in the capacitor body is not limited to that described in the third embodiment.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer feedthrough capacitor comprising:
a capacitor body having a dielectric characteristic;
grounding and signal inner electrodes arranged within the capacitor body;
first and second grounding terminal electrodes arranged on outer surface of the capacitor body; and
first and second signal terminal electrodes arranged on the outer surface of the capacitor body;

wherein the grounding inner electrode includes a first grounding main electrode portion, a second grounding main electrode portion, a first grounding lead electrode portion extending from the first grounding main electrode portion so as to be drawn to the outer surface of the capacitor body and connected to the first grounding terminal electrode, a second grounding lead electrode portion extending from the second grounding main electrode portion so as to be drawn to the outer surface of the capacitor body and connected to the second grounding terminal electrode, and a grounding connection electrode portion positioned between the first and second grounding main electrode portions;

wherein the signal inner electrode includes a first signal main electrode portion, a second signal main electrode portion, a first signal lead electrode portion extending from the first signal main electrode portion so as to be drawn to the outer surface of the capacitor body and connected to the first signal terminal electrode, a second signal lead electrode portion extending from the second signal main electrode portion so as to be drawn to the outer surface of the capacitor body and connected to the second signal terminal electrode, and a signal connection electrode portion positioned between the first and second signal main electrode portions;

wherein the first grounding main electrode portion and first signal main electrode portion oppose each other with a portion of the capacitor body therebetween;

wherein the second grounding main electrode portion and second signal main electrode portion oppose each other with a portion of the capacitor body therebetween;

wherein the grounding connection electrode portion has no area opposing the signal inner electrode; and wherein the signal connection electrode portion has no area opposing the grounding inner electrode.

2. A multilayer feedthrough capacitor according to claim 1, wherein the capacitor body includes rectangular first and second main faces opposing each other, first and second end faces extending in a shorter-side direction of the first and second main faces so as to connect the first and second main faces to each other, and first and second side faces extending in a longer-side direction of the first and second main faces so as to connect the first and second main faces to each other;

wherein the signal inner electrode and grounding inner electrode oppose each other in the opposing direction of the first and second main faces; and wherein the grounding connection electrode portion and signal connection electrode portion are separated from each other in the opposing direction of the first and second side faces of the capacitor body.

3. A multilayer feedthrough capacitor according to claim 2, wherein the first and second grounding terminal electrodes are arranged on the first side face of the capacitor body;

wherein the first and second signal terminal electrodes are arranged on the second side face of the capacitor body;

wherein the grounding connection electrode portion connects an end portion of the first grounding main electrode portion on the second side face side to an end portion of the second grounding main electrode portion on the second side face side; and wherein the signal connection electrode portion connects an end portion of the first signal main electrode portion on the first side face side to an end portion of the second signal main electrode portion on the first side face side.

4. A multilayer feedthrough capacitor according to claim 1, wherein the first and second grounding main electrode portions have areas different from each other in the grounding inner electrode; and wherein the first and second signal main electrode portions have areas different from each other in the signal inner electrode.

* * * * *